United States Patent [19]

Sandman et al.

[11] Patent Number: 4,681,920

[45] Date of Patent: Jul. 21, 1987

[54] CHEMICAL MODIFICATION OF POLYDIACETYLENE CRYSTALS

[75] Inventors: Daniel J. Sandman, Acton; Boris S. Elman, Allston, both of Mass.

[73] Assignee: GTE Laboratories Incorporated, Waltham, Mass.

[21] Appl. No.: 751,631

[22] Filed: Jul. 3, 1985

[51] Int. Cl.[4] .................................................. C08F 8/22
[52] U.S. Cl. .................................. 525/328.1; 525/356; 526/259
[58] Field of Search ....................... 526/259; 525/326.7

[56] References Cited

U.S. PATENT DOCUMENTS 4,125,534 11/1978 Yee ..................................... 526/259

FOREIGN PATENT DOCUMENTS 52-151295 12/1977 Japan .

OTHER PUBLICATIONS

K. Se et al, *Macromolecules*, 16, 1581 (1983).
K. Se et al, *Macromolecules*, 17, 2126 (1984).
U. Seiferheld et al, *Solid State Communications*, 47, No. 5, 391 (1983).
H. Ohnuma et al, *Macromolecules*, 17, 1285 (1984).
G. N. Patel et al, *J. Macromol. Sci.-Phys.*, B22, 259 (1983).
N. J. Poole et al., *Mol. Cryst. Liq. Cryst.*, 105, 55 (1984).
D. J. Sandman et al, *Mol. Cryst. Liq. Cryst.*, 106, 199 (1984).
Bloor et al, "Molecular Metals," W. E. Hatfield, ed., Plenum Press, New York, 1979.
D. R. Day et al, *J. Appl. Polym. Sci.*, 26, 1605 (1981).
H. Nakanishi et al, *J. Polym. Sci.: Polym. Lett. Edit.*, 21, 983 (1983).
H. Nakanishi et al, *Mol. Cryst. Liq. Cryst.*, 105, 77 (1984).

*Primary Examiner*—Joseph L. Schofer
*Assistant Examiner*—Bernard Lipman
*Attorney, Agent, or Firm*—Martha A. Finnegan; Frances P. Craig

[57] ABSTRACT

Crystalline brominated poly-1,6-di-(N-carbazolyl)-2,4-hexadiyne having at least two bromine atoms per repeat unit is disclosed. The crystalline brominated poly-1,6-di-(N-carbazolyl)-2,4-hexadiyne of the invention is characterized by a Fourier transform infrared spectrum which includes absorption at $795\pm5$, $835\pm5$, and $865\pm5$ cm$^{-1}$. A method for preparing the crystalline brominated poly-1,6-di-(N-carbazolyl)-2,4-hexadiyne of the invention is also disclosed.

4 Claims, No Drawings

CHEMICAL MODIFICATION OF POLYDIACETYLENE CRYSTALS

CROSS REFERENCE TO RELATED APPLICATION

U.S patent application Ser. No. 751,632, filed July 3, 1985, by D. J. Sandman, B. S. Elman, and C. S. Velazquez filed on even date herewith for Chemical Modification of Solid, Fully Crystalline Polydiacetylenes.

BACKGROUND OF THE INVENTION

This invention relates to polydiacetylenes and more particularly to the chemical modification of crystalline polydiacetylenes.

Polydiacetylenes are a class of fully ordered crystalline polymers which are of value as nonlinear optical elements, photoconductors, time-temperature indicators, and photoresists. Good thermal and mechanical properties have also been reported for this class of materials. While certain polydiacetylenes with relatively long side chains may be dissolved in selected solvents, many of the widely studied polydiacetylenes are insoluble. With respect to chemical reactivity of polydiacetylenes with external reagents, relatively little detailed information is available.

Crystalline polydiacetylenes can be prepared from diacetylene compounds by solid state polymerization techniques. The crystallinity of polydiacetylenes is a consequence of their synthesis via lattice controlled solid state polymerization when subjected to thermal or assorted radiative excitations. The polydiacetylenes occupy a key position among organic materials which exhibit phenomena manifesting delocalized interactions due to wide electronic bands. Moreover, polydiacetylenes are often available in processed form.

Beyond structural studies of monomers and polymers, studies of the mechanistic aspects of the polymerization, and the usual spectroscopic studies, only two seminal reports have appeared which show promise of a significant broadening of the scope of polydiacetylene research. They are the report of very high values of the third order nonlinear susceptibility ($\chi^{(3)}$) in single crystal poly-PTS, (bis -p-toluene sulfonate of 2.4-hexadiyne-1,6-diol) with major implications for optical signal processing, and reports of electronic carrier mobilities ($\mu$) comparable to Si and GaAs in single crystals of poly-PTS and -DCH (1,6-di-N-carbazolyl-2,4-hexadiyne), suggesting potential as novel electronic materials. While the carrier mobilities are indicated to be high, polydiacetylenes are insulators because, following $\sigma = ne\,\mu$, the number of carriers, n, is extremely low.

Prior to the present invention, controlled chemical modification of crystalline polydiacetylenes involving the formation of covalent bonds in crystalline polydiacetylenes had not been reported.

SUMMARY OF THE INVENTION

In accordance with the present invention, there is provided a crystalline brominated poly-1,6-di-(N-carbazolyl)-2,4-hexadiyne having at least 2 bromine atoms per monomer repeat unit, said crystalline brominated poly-1,6-di-(N-carbazolyl)-2,4-hexadiyne being characterized by a Fourier transform infrared spectrum including absorption at $795\pm5$, $835\pm5$, and $865\pm5$ cm$^{-1}$. These absorptions are not found in pristine poly-1,6-di-(N-carbazolyl)-2,4-hexadiyne. These bands are associated with out-of-plane C-H deformation vibrations in the carbazole rings.

In accordance with another aspect of the present invention, there is provided a method for preparing crystalline brominated poly-1,6-di-(N-carbazolyl)-2,4-hexadiyne. This method comprises contacting single crystals of poly-1,6-di-(N-carbazolyl)-2,4-hexadiyne with a mixture of liquid bromine and carbon tetrachloride, wherein the mixture contains from 70 to 100 weight percent liquid bromine, for a period of time sufficient to form a crystalline brominated poly-1,6-di-(N-carbazolyl)-2,4-hexadiyne, the brominated polymer having at least 2 bromine atoms per repeat monomer unit and characterized by a Fourier transform infrared spectrum including absorptions at $795\pm5$, $835\pm5$, and $865\pm5$ cm$^{-1}$.

For a better understanding of the present invention, together with other and further objects, advantages and capabilities thereof, reference is made to the following disclosure and appended claims.

DETAILED DESCRIPTION

In accordance with the present invention there is provided a crystalline brominated poly-1,6-di-(N-carbazolyl)-2,4-hexadiyne having at least two bromine atoms per repeat unit and characterized by a Fourier transform infrared spectrum including, inter alia, new absorptions at $795\pm5$, $835\pm5$, and $865\pm5$ cm$^{-1}$. Preferably the crystalline brominated poly-1,6-di-(N-carbazolyl) -2,4-hexadiyne polymer has from 2 to about 8 bromine atoms per repeat unit.

The crystalline brominated poly-1,6-di-(N-carbazolyl)-2,4-hexadiyne of the present invention is prepared by contacting crystals of poly-1,6-di-(N-carbazolyl)-2.4-hexadiyne with a mixture of liquid bromine and carbon tetrachloride, wherein the mixture contains from 70 to 100 weight percent liquid bromine, in order to brominate the poly-1,6-di-(N-carbazolyl) -2,4-hexadiyne to form crystalline brominated poly-1,6-di-(N-carbazolyl) -2,4-hexadiyne having at least 2 bromine atoms per repeat unit. Preferably, the method is carried out in a mixture containing 100 weight percent liquid bromine and no carbon tetrachloride, i.e., pure liquid bromine.

The controlled introduction of at least 2 bromine atoms per repeat unit is unexpected since the crystal structure of poly-1,6-di-(N-carbazolyl)-2,4-hexadiyne is tightly packed and contains no channels. This controlled bromination of crystalline poly-1,6-di-(N-carbazolyl) -2,4-hexadiyne can render a highly absorbing colored material transparent, if ca 8 Br atoms per repeat are introduced.

The capability of a controlled chemical modification of crystalline poly-1,6-di-(N-carbazolyl)-2,4-hexadiyne derives from a side-chain assisted process, i.e., a process initially controlled by the energy levels of the carbazole side chain group, rather than by the energy levels of the conjugated backbone.

The following Examples are given to enable those skilled in this art to more clearly understand and practice the present invention. These Examples should not be considered as a limitation upon the scope of the present invention but merely as being illustrative and representative thereof.

EXAMPLE 1

Interaction of Poly-1,6-di-(N-Carbazolyl) -2,4-hexadiyne (poly-DCH) with Bromine at Room Temperatures.

Poly-DCH (0.139 g), prepared from monomer crystallized from benzene, was allowed to stand in liquid bromine (2ml) at 25° C. for 24 hours. After isolation and vacuum drying, the material had gained 0.173 gms. in weight, corresponding to 6.3 Br atoms per repeat unit, and had acquired a copper color.

Analysis: Found, C, 37.30; H, 1.45; N, 3.08; Br, 58.80. The observed analysis (sum of C, H, N, Br is 100.63%) corresponds to $C_{30}H_{14}N_{2.13}Br_{7.1}$.

The resonance Raman spectrum, recorded with 6328 Angstrom excitation, revealed, inter alia Raman shifts of 1196, 1300, 1390, 1419, 1439, 1489, and 2071 cm$^{-1}$ and the solid state spectrum, which exhibits, inter alia, features at 6400 and 5500 Angstroms, establish that the material is a polydiacetylene. The Fourier transform infrared (FTIR) spectrum revealed loss of absorption at 719 and 750 cm$^{-1}$ found in pristine poly-DCH and appearance of, inter alia, new absorptions at 794, 831, and 867 cm$^{-1}$ it follows that the carbazole ring has undergone electrophilic bromination.

The x-ray powder diffraction of this material was distinct from that of poly-DCH and had reflections of d=6.96, 4.86, 4.14, 3.62, 3.53, 3.19, and 3.00 Angstroms. This material had an electrical resistivity greater than $10^{10}$ ohm-cm.

EXAMPLE 2

Interaction of poly-DCH with Bromine at Reflux

Poly-DCH (46 mg), prepared from monomer crystallized from benzene, was heated at reflux in bromine (4 ml.) for 16 hours. The resultant solid was isolated by suction filtration, washed with CCl$_4$, and vacuum dried for two hours when it was found to have total weight of 128 mg. Soxhlet extraction of this material with CCl$_4$ for two days reduced the weight to 124 mg., a weight gain of 169%, corresponding to about 8.6 Br atoms per repeat unit. The Raman spectrum (6328 Angstrom excitation) of this material exhibited Raman shifts of 1232, 1371, 1427, 1458, 1472, and 2101 cm$^{-1}$, and its solid state spectrum reveals a shoulder at 4500 Angstroms. The FTIR spectrum includes a strong absorption at 795, 835, and 867 cm$^{-1}$. The x-ray powder diffraction of this material exhibits reflections at d=7.06, 4.92, 3.66, 3.59, 3.21, 3.14, and 2.94 Angstroms. This material had an electrical resistivity greater than $10^{10}$ ohm-cm.

EXAMPLE 3

Interaction of poly-DCH with Bromine at 5° C.

Poly-DCH (38 mg), prepared from monomer crystallized from benzene, and bromine were separately cooled to 5° C. in a refrigerator and then mixed. After 48 hours at 5° C., the solid was isolated as in previous examples to give a copper colored material, 72 mg, 89% weight gain. Using CHBr$_3$/CCl$_4$ mixtures, this material was fractionated by density to give 13 mg of product having a density between 1.933 g/cm$^3$ and 1.978 g/cm$^3$; 33 mg of product having a density of about 1.931–1.933 g/cm$^3$; and 24 mg of product having a density less than 1.93 g/cm$^3$. Using a poly-DCH unit cell volume of 1040A$^3$ and a covalent Br volume of 30A$^3$, calculated densities for poly-DCHBr$_4$, —Br$_5$, and —Br$_6$ are 1.89, 2.00, and 2.09 g/cm$^3$, respectively.

EXAMPLE 4

Interaction of poly-DCH with Bromine: Effect of Time and Temperature in the Initial Stages of Reaction These experiments were performed with poly-DCH prepared from monomer crystallized from ethyl acetate.

A. Poly-DCH (217.2 mg) was reacted with bromine (20 ml.) at 20° for 77 minutes. The resulting material gained 62.4 mg in weight (28.7% ca 1.4 Br atoms per repeat), and it was heterogeneous, i.e., the crystal contained both brominated and pristine phases, on microscopic examination.

B. Poly-DCH (215.1 mg) was reacted with bromine (20 ml.) at −5° for 71 minutes. The material gained 128.9 mg in weight (60%, ca 3 Br atoms per repeat). Microscopic examination revealed that the material was inhomogenous and that the ends of the crystals were orange in color while the remainder of the crystal was pristine in appearance.

C. Poly-DCH (45.8 mg) was reacted with bromine (10 ml.) at 20° for two hours. The material gained 15.2 mg (33%, ca 1.6 Br atoms per repeat unit) in weight. Microscopic examination revealed the presence of pristine polymer in the sample and this was confirmed by the x-ray powder diffraction pattern which showed strong lines for all of the strong reflections of poly-DCH.

D. Poly-DCH (55.9 mg) was reacted with bromine (15 ml.) at −5° for 2 hours. The material gained 31.4 mg (56%, 2.8 Br atoms per repeat unit) in weight. Microscopic examination of the material suggested homogeneity. X-ray powder diffraction suggested conversion to a new-phase whose strong reflections (d>2.50 Angstroms) 5.23, 4.78, 4.25, 4.19, 3.83, 3.18, 2.87, 2.61 Angstroms) do not correspond to the pristine polymer. The FTIR spectrum (600–900 cm$^{-1}$) was consistent with mono- and dibrominated carbazole rings with absorption at 646, 719, 747, 794, 832, and 867 cm$^{-1}$.

EXAMPLE 5

Introduction of 4-5 Bromine Atoms per poly-DCH Repeat

A. Poly-DCH (83.0 mg), prepared from monomer crystallized from ethyl acetate, interacted with bromine (15 ml) at −5° C. for 5¾ hours. The material gained 76.7 mg (92.4%, 4.7 Br atoms per repeat). The x-ray powder diffraction pattern had reflections at (d>2.50 Angstroms) 5.21, 4.78, 4.31, 4.14, 3.90, 3.82, 3.58, 3.40, 3.19, 2.97, 2.86, 2.62, and 2.56 Angstroms.

B. In a separate experiment, poly-DCH (68.4 mg), prepared from monomer crystallized from ethyl acetate, was reacted with bromine at −5° for 4 hours. The polymer gained 58.4 mg (85.4%, 4.3 Br atoms per repeat) and its x-ray powder diffraction pattern showed reflections at d=6.87, 6.51, 5.92, 5.26, 4.82, 4.37, 4.30, 3.90, 3.83, 3.60, 3.19, 2.89, and 2.61 Angstroms.

EXAMPLE 6

Interaction of Poly-DCH Br 5.7 with Bromine at Reflux

A sample of poly-DCH which had gained 113% in weight (5.7 Br atoms per repeat) (117.8 mg) was heated at reflux with bromine (30 ml) for 21¼ hours. The material gained only 9.5 mg in weight and the product was similar in appearance to the brominated starting material.

EXAMPLE 7

Interaction of Poly-DCH with 75:25 w/w Bromine/Carbon Tetrachloride at Reflux

Poly-DCH (281.5 mg), prepared from monomer crystallized from ethyl acetate, was heated with bromine (27 gms) and carbon tetrachloride (9 gm) at reflux for 18 hours. Solid was indated (418 mg) and exposed to reagent for a further 22¼ hours. A silver gray solid 688 mg, 144% weight gain, 7.4 Br atoms per repeat unit was indated. The x-ray powder pattern of this material revealed reflections at d=14.68, 7.19, 6.93, 6.02, 4.96, 4.29, 3.70, 3.64, 3.45, 3.16, and 2.96 Angstroms. The FTIR spectrum of this material revealed absorptions at 796, 833, and 867 $cm^{-1}$.

Analysis. Found: C, 34.72; H, 1.42; N, 2.70; Br, 59.52. The observed analysis corresponds to $C_{30}H_{14.6}N_2Br_{7.7}$.

EXAMPLE 8

Interaction of Poly-DCH with Bromine at Reflux

Poly-DCH (121 mg), prepared from monomer crystallized from N,N-dimethylformamide, was heated at reflux with bromine (10 ml.) for 23 hours. The resulting tan-yellow material weighed 319 mg and had an FTIR spectrum with absorption at 796, 833, and 867 $cm^{-1}$.

Analysis. Found: C, 33.76; H, 1.49; N, 2.73; Br, 62.56. The observed analysis corresponds to $C_{28.8}H_{15.2}N_{2.0}-Br_{8.03}$.

EXAMPLE 9

Interaction of Poly-DCH with Bromine at Reflux and Subsequent Further Bromination Poly-DCH (240 mg), prepared from monomer crystallized from ethyl acetate, was heated with bromine (50 ml.) at reflux for 22½ hours. After filtering and vacuum drying, 613 mg (156% weight gain, 8.0 Br per repeat) of product was obtained.

Analysis. Found: C, 33.42; H, 1.38; N, 2.74; Br, 62.30. The observed analysis corresponds to $C_{28.4}H_{14.0}N_{2.0}Br_{7.97}$.

The above material (82.8 mg) was exposed to a mixture of bromine (28.2 gm) and carbon tetrachloride (9.4 g) for 20.5 hours. The weight of the isolated product was 84.8 mg. The FTIR spectrum of the product showed absorption at 796, 834, and 867 $cm^{-1}$.

Poly-DCH was found to be inert to refluxing in mixtures of bromine in carbon tetrachloride where the weight percent of liquid bromine in the mixture was about 50%. Poly-1,6-di-(N-carbazolyl)-2,4-hexadiyne has also been found to be inert to bromine vapor upon exposure to bromine vapor for 6 weeks at room temperature.

In the preceding examples it was observed that the bromination reaction occurs more rapidly at lower temperatures. The preceding examples further revealed that if the crystals were removed from the liquid bromine prior to completion of the bromination reaction, both ends of the needle-shaped crystals had been chemically modified while the center portions of the crystals consisted of unreacted polymer. The chemical modification of the partially modified crystals could be completed by returning the partially modified polymer crystal to the liquid bromine. This suggests that the chemical modification of the crystalline poly-1,6-di-(N-carbazolyl)-2,4-hexadiyne begins at the two end faces of the needle shaped polymer crystal and proceeds from the end carbazole faces of the needle-like crystal to the center of the crystal until the entire crystal of the polymer has been chemically modified.

The modified polydiacetylene materials of the present invention are partially soluble in selected solvents. This partial solubility provides a specific approach to the processing of polydiacetylenes from macro to microsize elements. Such a processing capability is essential to the ultimate commercial use of polydiacetylene waveguides and other polydiacetylene optical devices.

Bromination of the crystalline poly-1,6-di-(N-carbazolyl)-2,4-hexadiyne in accordance with the present invention produces a crystalline brominated polymer in which the chemical modification has occurred throughout the entire polymer crystal lattice. Nothing is meant to imply, however, that each side chain with a carbazole on the polydiacetylene backbone is identically brominated. However, each repeat unit of the chemically modified crystalline polymer does contain at least two bromine atoms.

The following example describes the results of an attempt to prepare a crystalline brominated carbazole substituted polydiacetylene by first brominating the carbazole group on a carbazole substituted diacetylenic monomer and then polymerizing the brominated monomer by exposure to gamma radiation.

EXAMPLE 10

Synthesis of N-propargyl-3,6-dibromo carbazole

Sodium amide (7.73 g, 0.198 mole) was carefully added to a suspension of 3,6-dibromocarbazole (54.7 g, 0.168 mole) in liquid ammonia (ca. 600 ml.) under argon atmosphere. After solution occurred, propargyl bromide (20.2 g, 0.170 mole) in toluene was added dropwise to the solution over 25 minute period. The reaction mixture was stirred for an additional 100 minutes, and the ammonia was allowed to evaporate. The resultant solid was washed with water and recrystallized from ethanol to give 39 g (63% yield) tan needles, mp 193°–194°. This solid gave an infrared spectrum with significant features at 3290, 2120, 870, 830, 800, and 790 $cm^{-1}$.

Anal. Calcd. for $C_{15}H_9NBr_2$: C, 49,62; H. 2.50; N, 3.86; Br, 44.02. FOUND: C, 49.47; H, 2.65; N, 3.88; Br, 43.78.

Synthesis of Bis(3', 6'-dibromo-N-carbazolyl) -2,4-hexadiyne

To a solution of N-propargyl-3,6-dibromocarbazole in dioxane (150 ml) was added tetramethylethylenediamine (0.6 g) and CuCl(0.5 g). The mixture was stirred and oxygen was bubbled through for 3½ hours. The reaction mixture was poured into 0.6M hydrochloric acid and a greenish precipitate was collected and vacuum dried to give a 72% yield. The product was recrystallized from a mixture of N,N-dimethylformamide and toluene, and its IR(nujol) spectrum showed absorption at 650, 720, 735, 785, 802, 832, 867, and 888 $cm^{-1}$.

Anal. Calcd. for $C_{30}H_{16}N_2Br_4$; C, 49.76; H, 2.23; N, 3.87; Br, 44.14. Found: C, 49.89; H, 2.47; N, 3.69; Br, 44.11.

The brominated monomer was then exposed to gamma radiation in order to form the polymer. The brominated monomer is far less reactive to $^{60}Co$ gamma radiation than DCH. The percent of monomer converted to polymer was low as evidenced by the fact that all of the exposed material dissolved in N,N-dimethylformamide. The product of Example 10 does not possess a degree of polymerization as high as the degree of polymerization found in the brominated crystalline polymer of the present invention. The low degree of polymerization found in the product of Example 10 is due to the difficulty encountered in solid state polymerizing the brominated monomer.

A low degree of polymerization is similarly exhibited by 1,6-bis(N-3-bromocarbazolyl) -2,4-hexadiyne polymer prepared in accordance with the method of K. C. Yee in Example 16 of U.S. Pat. No. 4,125,534 issued Nov. 14, 1978. The low degree of polymerization exhibited by the polymer of Example 16 of Yee is again due to the difficulty of polymerizing a brominated monomer.

While there has been shown and described what are at present considered the preferred embodiments of the invention, it will be obvious to those skilled in the art that various changes and modifications can be made therein without departing from the scope of the invention as defined by the appended claims.

What is claimed is:

1. A brominated polydiacetylene material consisting essentially of crystalline brominated poly-1,6-di-(N-carbazolyl)-2,4-hexadiyne having at least two and up to about nine bromine atoms per repeat unit and characterized by a Fourier transform infrared spectrum including absorption at $795\pm5$, $835\pm5$, and $865\pm5$ cm$^{-1}$.

2. A crystalline brominated poly-1,6-di-(N-carbazolyl)-2,4 hexadiyne having approximately 8 to 9 bromine atoms per repeat unit and characterized by a Fourier transform infrared spectrum including absorption at $795\pm5$, and $865\pm5$ cm$^{-1}$, and an x-ray powder diffraction pattern exhibiting reflections at $d=7.06$, 4.92, 3.66, 3.59, 3.21, 3.14, and 2.94 Angstroms.

3. A material in accordance with claim 1 wherein the crystalline brominated poly-1,6-di-(N-carbazolyl) -2,4-hexadiyne has from 2 to about 6 bromine atoms per repeat unit.

4. A crystalline brominated poly-1,6-di-(N-carbazolyl)-2,4-hexadiyne having about 5 to about 7 bromine atoms per repeat unit and characterized by a Fourier transform infrared spectrum including absorption at $795\pm5$, $835\pm5$, and $865\pm5$ cm$^{-1}$ and an x-ray powder diffraction pattern exhibiting reflections at $d=6.96$, 4.86, 4.14, 3.62, 3.53, 3.19, and 3.00 Angstroms.

* * * * *